(12) United States Patent
Robertson et al.

(10) Patent No.: US 7,519,238 B2
(45) Date of Patent: *Apr. 14, 2009

(54) IMAGE AND INFORMATION MANAGEMENT SYSTEM

(75) Inventors: Tina L. Robertson, Merritt Island, FL (US); Michael C. Raney, Cocoa, FL (US); Dennis M. Dougherty, Merritt Island, FL (US); Peter C. Kent, Titusville, FL (US); Russell X. Brucker, Titusville, FL (US); Daryl A. Lampert, Saint Cloud, FL (US)

(73) Assignee: United Space Alliance, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/863,765

(22) Filed: Sep. 28, 2007

(65) Prior Publication Data

US 2008/0019614 A1    Jan. 24, 2008

Related U.S. Application Data

(63) Continuation of application No. 11/466,508, filed on Aug. 23, 2006, now Pat. No. 7,295,719.

(60) Provisional application No. 60/711,414, filed on Aug. 26, 2005, provisional application No. 60/711,413, filed on Aug. 26, 2005.

(51) Int. Cl.
*G06K 9/54* (2006.01)

(52) U.S. Cl. .................. 382/305; 382/306; 382/307; 707/100

(58) Field of Classification Search .......... 382/305, 382/306, 307; 358/403, 404; 707/2, 4, 7, 707/101, 102, 100, 104.1
See application file for complete search history.

(56) References Cited

U.S. PATENT DOCUMENTS

| 5,708,805 | A | 1/1998 | Okamoto et al. ............ 395/603 |
|---|---|---|---|
| 5,819,288 | A | 10/1998 | De Bonet .................... 707/104 |
| 5,852,823 | A | 12/1998 | De Bonet ....................... 707/6 |
| 5,899,999 | A | 5/1999 | De Bonet .................... 707/104 |
| 5,911,139 | A | 6/1999 | Jain et al. ...................... 707/3 |
| 6,553,365 | B1 | 4/2003 | Summerlin et al. ............ 707/2 |
| 6,590,586 | B1 | 7/2003 | Swenton-Wall et al. ..... 345/730 |
| 6,628,305 | B1 | 9/2003 | Hong et al. ................. 715/734 |
| 6,708,184 | B2 | 3/2004 | Smith et al. ............. 707/104.1 |
| 6,721,759 | B1 | 4/2004 | Rising, III ................. 707/104 |

(Continued)

*Primary Examiner*—Matthew C Bella
*Assistant Examiner*—Ali Bayat
(74) *Attorney, Agent, or Firm*—Greenberg Traurig LLP

(57) ABSTRACT

A system and methods through which pictorial views of an object's configuration, arranged in a hierarchical fashion, are navigated by a person to establish a visual context within the configuration. The visual context is automatically translated by the system into a set of search parameters driving retrieval of structured data and content (images, documents, multimedia, etc.) associated with the specific context. The system places "hot spots", or actionable regions, on various portions of the pictorials representing the object. When a user interacts with an actionable region, a more detailed pictorial from the hierarchy is presented representing that portion of the object, along with real-time feedback in the form of a popup pane containing information about that region, and counts-by-type reflecting the number of items that are available within the system associated with the specific context and search filters established at that point in time.

20 Claims, 16 Drawing Sheets

U.S. PATENT DOCUMENTS

| | | | |
|---|---|---|---|
| 6,744,936 B2 | 6/2004 | Irons et al. | 382/306 |
| 6,785,667 B2 | 8/2004 | Orbanes et al. | 707/1 |
| 6,792,164 B2 | 9/2004 | Syeda-Mahmood | 382/305 |
| 6,804,683 B1 | 10/2004 | Matsuzaki et al. | 707/104.1 |
| 6,804,684 B2 | 10/2004 | Stubler et al. | 707/104.1 |
| 6,901,411 B2 | 5/2005 | Li et al. | 707/104.1 |
| 7,096,226 B2 * | 8/2006 | Brock et al. | 707/100 |
| 7,232,064 B1 | 6/2007 | Toohey | |
| 7,353,246 B1 * | 4/2008 | Rosen et al. | 709/202 |
| 2001/0003182 A1 | 6/2001 | Labelle | 707/3 |
| 2002/0047856 A1 | 4/2002 | Baker | 345/700 |
| 2002/0152267 A1 | 10/2002 | Lennon | 709/203 |
| 2002/0188602 A1 | 12/2002 | Stubler et al. | 707/3 |
| 2003/0018607 A1 | 1/2003 | Lennon et al. | 707/1 |
| 2003/0167283 A1 | 9/2003 | Remsen et al. | 707/104.1 |
| 2003/0187744 A1 | 10/2003 | Goodridge | 705/26 |
| 2003/0187844 A1 | 10/2003 | Li et al. | 707/7 |
| 2003/0208473 A1 | 11/2003 | Lennon | 707/3 |
| 2003/0227487 A1 | 12/2003 | Hugh | 345/777 |
| 2004/0190034 A1 * | 9/2004 | Ozawa et al. | 358/1.13 |
| 2005/0010553 A1 | 1/2005 | Liu | 707/1 |
| 2005/0063575 A1 * | 3/2005 | Ma et al. | 382/128 |
| 2005/0114325 A1 | 5/2005 | Liu et al. | 707/3 |
| 2005/0267994 A1 | 12/2005 | Wong et al. | 709/246 |
| 2006/0149781 A1 | 7/2006 | Blankinship | 707/103 R |
| 2006/0161863 A1 * | 7/2006 | Gallo | 715/810 |
| 2007/0053513 A1 | 3/2007 | Hoffberg | |
| 2007/0118553 A1 | 5/2007 | Zhou et al. | 707/102 |

* cited by examiner

FIG. 14

IMAGE AND INFORMATION MANAGEMENT SYSTEM

This application is a continuation of and claims the benefit of U.S. patent application Ser. No. 11/466,508, filed Aug. 23, 2006 now U.S. Pat. No. 7,295,719, which is related to and claims the benefit of Provisional U.S. Patent Application Ser. No. 60/711,414 entitled "Automated Resource Planning Tool and User Interface", filed Aug. 26, 2005, and Provisional U.S. Patent Application Ser. No. 60/711,413 entitled "Image and Information Management System", filed Aug. 26, 2005, which are hereby incorporated by reference in their entirety.

The invention described herein was made in the performance of work under NASA Contract No. NAS9-20000 and is subject to the provisions of Section 305 of the National Aeronautics and Space Act of 1958 (42 U.S.C. 2457).

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates to the field of information systems, and more particularly provides a system and method through which images of and information about an object can be stored, organized, and searched to facilitate ease of retrieval and use.

BACKGROUND

The efficient storage, search, and retrieval of information has long been a problem. From filing cabinets full of paper to hard-drives full of data, individuals, businesses, and governments have struggled to find good organization techniques. The advent of databases and enhanced search and indexing algorithms has made it easier to find desired electronic data. For example, Liu et al., U.S. Patent Application Publication No. 2005/0114325, published May 26, 2005, and Liu, U.S. Patent Application Publication No. 2005/0010553, published Jan. 13, 2005, disclose a semi-automatic means for annotating multimedia objects which also permits retrieval of the multimedia objects. The annotation process annotates multimedia objects, such as digital images, with semantically relevant keywords. Such annotation is performed in the background, with the results presented to the user for verification. The user can also add his or her own keywords or other annotation information. Similarly, Remsen et al., U.S. Patent Application Publication No. 2003/0167283, published Sep. 4, 2003, discloses a system for managing taxonomic information regarding biological organisms that allows researchers to quickly retrieve information on a given organism regardless of the name associated with the information.

While such systems can be advantageous where the information to be cataloged is mostly text or includes textual metadata, searching a set of multimedia objects, such as images, sounds, or video, for a particular item of interest can be difficult. Stubler et al., U.S. Pat. No. 6,804,684, issued Oct. 12, 2004, discloses a method for associating semantic information with multiple images in an image database environment. Stubler discloses generating captions or semantic labels for an acquired imaged based upon similarities between the acquired image and one or more stored images, where the stored images have preexisting captions or labels. Similarly, DeBonet, U.S. Pat. No. 5,819,288, issued Oct. 6, 1998, discloses a statistically based image group descriptor for use in an image classification and retrieval system. DeBonet discloses an apparatus and method for generating a semantically based, linguistically searchable, numeric descriptor of a pre-defined group of input images which can automatically classify individual images to allow for rapid identification of similar images.

The systems described above facilitate searching by annotating a database entry with a keyword. Where the data may be organized by a plurality of key words, or where the data may not have appropriate key words, database searches may not return the entire set of available information, and thus valuable information may be effectively inaccessible when needed. Matsuzaki et al., U.S. Pat. No. 6,804,683, issued Oct. 12, 2004, attempts to overcome those deficiencies by disclosing a means for retrieving similar images that allows a user to specify a "region of interest", and compares a "feature quantity calculation" of the region to the quantity calculation of other images in the database. The search results are presented in order of decreasing similarity from the image database.

It can clearly be difficult to find appropriate data in a database, and the techniques described above have been developed to improve search results. Once the search results are obtained, the next concern is the presentation of these search results. Baker, U.S. Patent Application Publication No. 2002/0047856, published Apr. 25, 2002, discloses a method of providing access to a collection of images through a single web page, which Baker refers to as "stacked images." Baker discloses building a database that represents a plurality of separate images, and then displaying at least one of these images. When a user clicks the image, the next image in the "stack" is displayed. Lennon et al., U.S. Patent Application Publication No. 2003/0018607, published Jan. 23, 2003, discloses a system for allowing a user to search different metadata collections over the Internet. Lennon discloses dynamic generation of an XML description of an associated metadata collection that reflects a structure by which the associated metadata collection may be browsed. This structure includes XML schema definitions of types for Categories, Subcategories, Classes, and Images. Lennon discloses that each declared descriptor within the defined type inherits a visualIdentifier attribute which is used by a media browser to provide visual representation of the content of the item. For example, if the item is an image then the visualIdentifier attribute value will typically contain a URI of a thumbnail of the image; if the item is a Category, Subcategory, or Class, then the URI may point to an icon. If the attribute is not present, the media browser generates a visual identifier for the item from a provided textIdentifier attribute value or from the name of the element.

While several different techniques exist for the search, retrieval, and presentation of information, most are too cumbersome to be useful in instances where time is of the essence, or where it is critical that the all relevant information be presented without overwhelming the user. For example, Remsen's system is intentionally over inclusive, and provides information about related species in addition to the species for which the user is searching. Similarly, Stubler's and DeBonet's search techniques are likely to both include information that is not relevant, and to overlook relevant images.

SUMMARY

Accordingly, the instant disclosure is directed to an image and information management system that substantially obviates one or more of the problems due to limitations and disadvantages of the related art. As used herein, the term image includes photographs, line art, computer renderings, animation, motion video, and the like, and is not intended as limited to a particular type of image.

The present disclosure describes a system and methods for allowing users to access relevant information about an object quickly and easily. An object can be a physical item such as a spacecraft or aircraft, a piece of hardware or equipment, a facility, a building, or a piece of machinery, among others, or an abstract item such as a schematic, a flow diagram, an illustration, or a representation of a business function, and the like.

The instant disclosure also describes a system and method for providing a graphical, drill-down interface through which information about an object can be accessed.

The instant disclosure also describes a system and method for providing a structured interface through which information about an object can be captured and cataloged.

Additional features and advantages will be set forth in the description which follows, and in part will be apparent from the description, or may be learned by practice of the disclosure. The objectives and other advantages of the disclosed image and information management system will be realized and attained by the structure particularly pointed out in the written description and claims hereof as well as the appended drawings.

In many instances, the information storage and retrieval systems in the prior art are sufficient for business purposes. However, where time is of the essence, such as occurs in an assembly line; in the manufacture and maintenance of mission-critical equipment such as aircraft or watercraft; during fire and other emergencies; and the like, it is critical that users be able to quickly and easily access all relevant information. By way of example, without limitation, any delays in the launch of a spacecraft can have significant economic impact upon the entire operation. From manpower costs due to missed launch windows and contract-related fines to additional fuel and real estate costs, every minute launch is delayed has a significant economic impact. Similarly, where the object is not available for analysis, such as in an orbiting spacecraft, or where the object is effectively inaccessible, such as the wiring of an aircraft while the aircraft is in flight, the antenna array on a submarine while the submarine is at depth, or an underwater valve assembly on an oil rig, it can be advantageous to have well documented and readily accessible information. By way of example, without limitation, troubleshooting on-orbit or in-flight anomalies in a spacecraft requires timely access to spacecraft configuration data in the form of imagery and information. Review of configuration imagery is critical to quickly developing in-flight repair procedures. In these and other scenarios, it is essential that, when there is a problem, those addressing the problem have reliable access to the pertinent information about the object that is the subject of the problem. The instant disclosure provides a system and methods through which users can gain rapid and reliable access to such information.

A graphical, image-based interface consisting of a hierarchically structured collection of integrated pictorial views of an object's configuration can be presented to one or more users. The hierarchy of pictorial views enables users to establish a visual context within the object's configuration that defines search parameters driving retrieval of information associated with the specific context. For example, users can access and refer to photographs, engineering drawings, line-art, or images of a spacecraft associated with a visual context established for the information retrieval search. The system can allow users to drill down quickly to a visual context within the object, such as drilling down to a faulty component within the object, by simply clicking on or otherwise interacting with (henceforth referred to herein as clicking, for clarity) "hotspots", actionable regions, or zones in an image or successive images.

The interface can automatically translate the user's interactions into search parameters, which are then used as a basis for information retrieval, including accessing a next-lower level of an image or "drilldown" hierarchy where appropriate. The retrieved information can include images of a selected component, including photographs taken during the manufacture and/or assembly of the individual component as well as those taken during the component's installation. In addition, information about the photographed component, such as, without limitation, part and serial number(s) of items within the component, schematics, dates of manufacture, installed software and version numbers, lot numbers, chemical composition, test results, related tools, and the like can also be made available to the user.

A standardized interface is also provided through which information about the component, including component photographs, can be cataloged and stored. This embodiment can also integrate with and monitor other information databases, such as document management systems and, using eXtensible Markup Language ("XML")-based tags, Standardized Generalized Markup Language (SGML)-based tags, key words, and the like stored within a document or in document-related metadata, automatically associate the document with appropriate information stored in the system.

The image and information management system has application in numerous commercial and government settings. By way of example, without limitation, any commercial entity with requirements for visual, as-built, or operational configuration baselines can benefit from such a system. Such commercial entities may include, but are not limited to, companies engaged in oil and gas extraction, mining, petroleum refining, chemical production, power generation or heavy construction who operate complex sets of equipment and facilities supporting their core business functions. These companies can benefit from the Visual Configuration Baselines ("VCBs") created and maintained through the system by making imagery, documentation, test results, test data, engineering models, additional items in inventory, and other critical data readily available for troubleshooting, problem resolution, product and process design, operations or analytical purposes.

The system also provides browser-integrated, in-line viewing tools to support examination of high-resolution photographs, and browser-integrated Digital Content Capture tools for assembling and storing information (structured data and multi-media content) associated with the object. The information is stored in relational form in a commercial, off the shelf (COTS) document management system.

The system provides a very simple and reliable search/retrieval interface by moving the burden of specifying the exact interrelated attribute search criteria from the user to the underlying search system with the user being responsible for inputting only a small number of commonly known search values in an easy and intuitive fashion. Once the user provides a minimum input set, the system transparently generates a fully qualified set of search criteria that accurately returns a result set corresponding to the visual context and filters established by the user.

The image and information management system can function as part of an overall tool set through which a space flight can be monitored and controlled from early conception and design phases through execution. Such a system preferably includes a tool for automating crew scheduling, wherein the tool can automatically adjust crew schedules based on changes in circumstances, such as changes in vehicle attitude and trajectory. Additionally, the tool can display photographs or locations (zones) managed by the system through integrated hypertext links embedded within crew procedure documents used to accomplish tasks on-board a space flight vehicle.

The overall system may also include a real-time spaceflight trajectory tool, which calculates current and projected trajectories based on information about the vehicle. In such a system, the trajectory tool can monitor information from the vehicle, such as attitude maneuvers, altitude changes (e.g. away from a celestial body, closer to the celestial body, etc.), or actual vehicle position in space to update the vehicle's trajectory. As described herein, by monitoring these trajectory changes, the overall system can dynamically monitor and adjust crew schedules to more efficiently use the vehicle's resources and help the crew and ground or support personnel deal with and diagnose problems.

It is to be understood that both the foregoing general description and the following detailed description are exemplary and explanatory and are intended to provide further explanation of the invention as claimed.

BRIEF DESCRIPTION

The accompanying drawings, which are included to provide a further understanding of the invention and are incorporated in and constitute a part of this specification, illustrate embodiments of the invention and together with the description serve to explain the principles of at least one embodiment of the invention.

In the drawings:

FIG. 14 is a screen capture of an orbiter/vehicle documentation log interface as implemented in an embodiment of the disclosed image and information management system.

DETAILED DESCRIPTION

Reference will now be made in detail to the embodiments of the disclosed image and information management system, examples of which are illustrated in the accompanying drawings.

Figure 1:
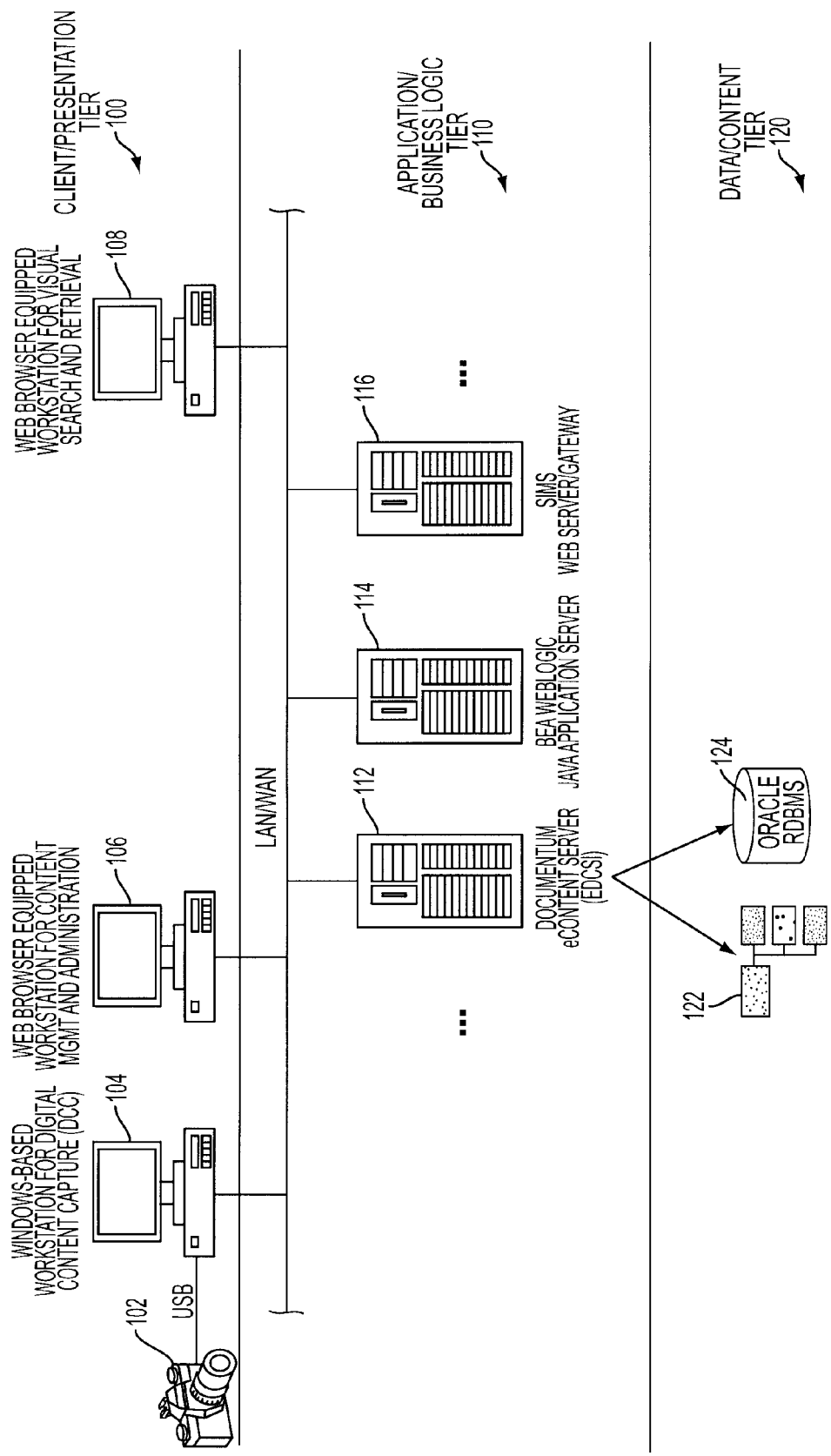
FIG. 1 is a block diagram of a computer architecture supporting an embodiment of the disclosed image and information management system.

FIG. 1 is a block diagram of a computer architecture supporting an embodiment of the disclosed image and information management system. The illustrated architecture is an "n-tier" architecture that is implemented in three tiers, client/presentation tier 100, application/business logic tier 110, and data/content tier 120. Client/presentation tier 100 represents the client computers through which users can interact with and retrieve information from application/business logic tier 110 and data/content tier 120. Application/business logic tier 110 represents computer hardware and software responsible for managing information storage and retrieval, user interface generation, and the like. Data/Content tier 120 represents physical data storage.

In FIG. 1, Camera 102 is used to collect photographs of various components. These photographs are transferred to Computer 104, where the photographs and other images are organized and cataloged for storage by eContent Server 112 as files in a file system 122 and/or a database 124. Once stored therein, the pictures are made available to Computers 106 and 108 via web server 116, which presents data collected from eContent Server 112 by Application Server 114 based on user requests.

Figure 2:
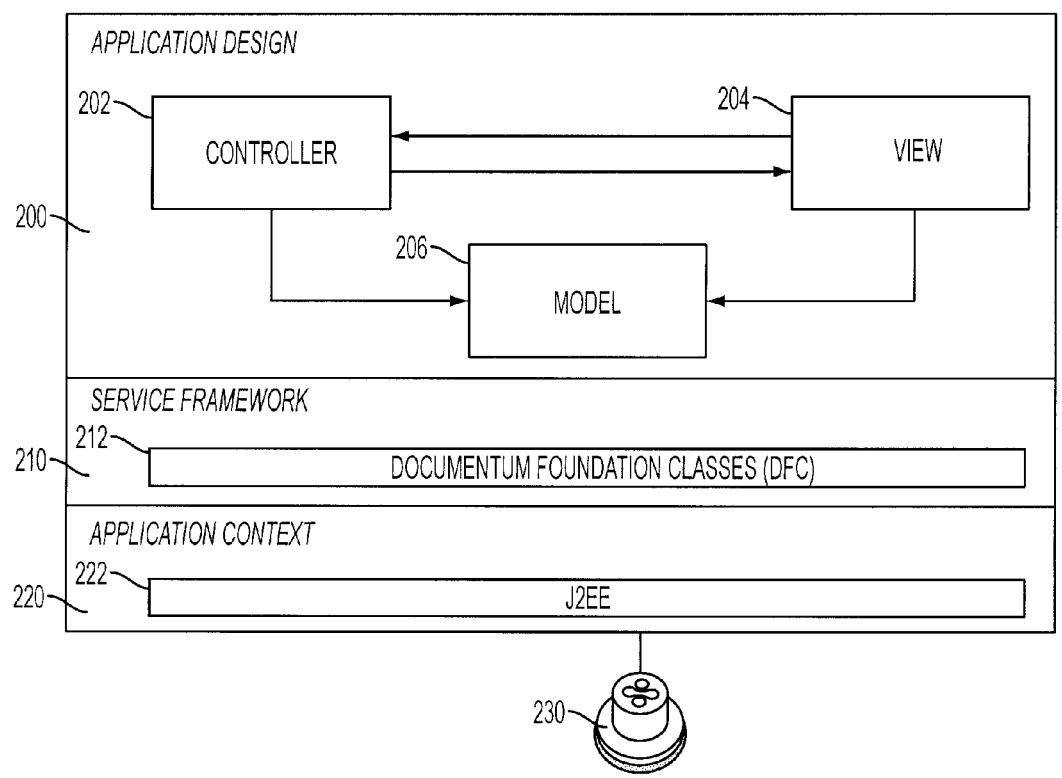
FIG. 2 is a block diagram illustrating a conceptual software architecture for implementing an embodiment of the disclosed image and information management system.

FIG. 2 is a block diagram illustrating a software architecture for implementing an embodiment of the disclosed image and information management system. In FIG. 2, Application Design layer 200 is responsible for controlling access to lower layers and for providing an interface through which users can retrieve data from database and file system 230. Application Design layer 200 is built around model 206, which has knowledge of the data structures used by the lower layers and is responsible for translating user information requests into requests serviceable by the lower layers. View 204 is responsible for translating information from Model 206 into an appropriate user interface. Controller 202 manages the evaluation of information from the user interface and translation of such information into a format usable by Model 206.

Service Framework 210 provides an interface to the underlying database and file system 230. Service Framework 210 receives requests from Model 206 and routes them to an appropriate data-access interface, such as Documentum® Foundation Classes ("DFC") 212. DFC 212 allows Service Framework 212 to access information stored in a traditional content management or document management system. An advantage to the use of a Service Framework-like layer is the ability to insert new data access "drivers" into the system without having to rearchitect the entire system.

Application Context 220 represents traditional data storage and server software and/or hardware that together enable solutions for developing, deploying, and managing multi-tier server-centric applications.

Figure 3:
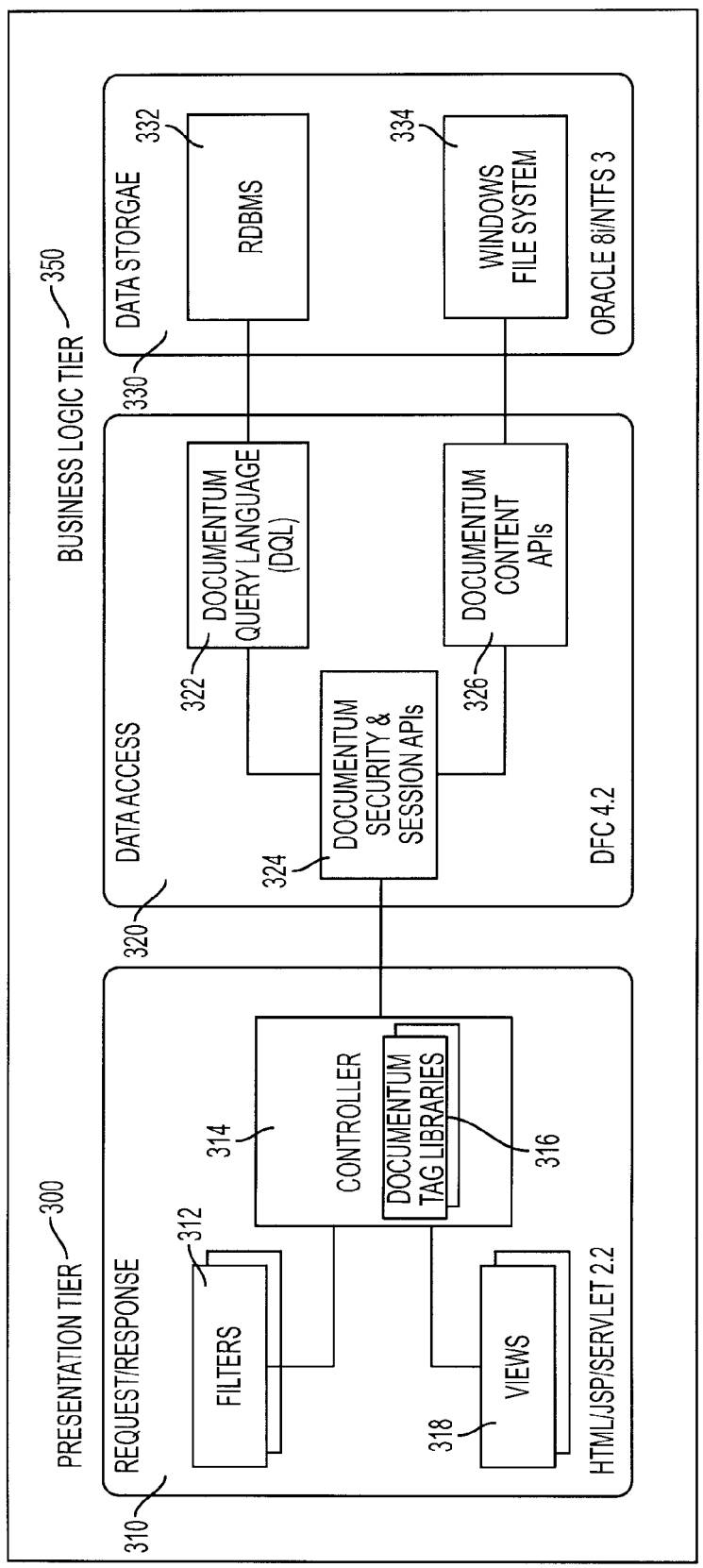
FIG. 3 is an alternative block diagram of the architecture of FIG. 1.

FIG. 3 is an alternative block diagram of the architecture of FIG. 1. In FIG. 3, Presentation Tier 300 includes request/response interface 310. Request/response interface 310 is preferably created by an Hypertext Markup Language ("HTML")/Java Server Pages server, and can be comprised of three main components. The first component, controller 314, is responsible for receiving user input from views 318 and transferring the information to Data Access 320 (described below). Controller 314 also receives information from Security and Session APIs 324 and transfers the information to the user via views 318 based on user selections in Filters 312.

One aspect of controller 314 can communicate with Security and Session APIs 324 via tag libraries 316. Tag libraries 316 provide controller 314 with information about the underlying data structure used by Security and Session API's 324. Security and Session API's 324 receives information requests from and transfers information to controller 314. Security and Session API's 324 can distinguish between requests for information contained in a relational database (illustrated as RDBMS 332) and files stored as part of the file system (illustrated as File System 334) and route the request through an appropriate handler, such as Content APIs 326 and Query Language 322.

Figure 4:
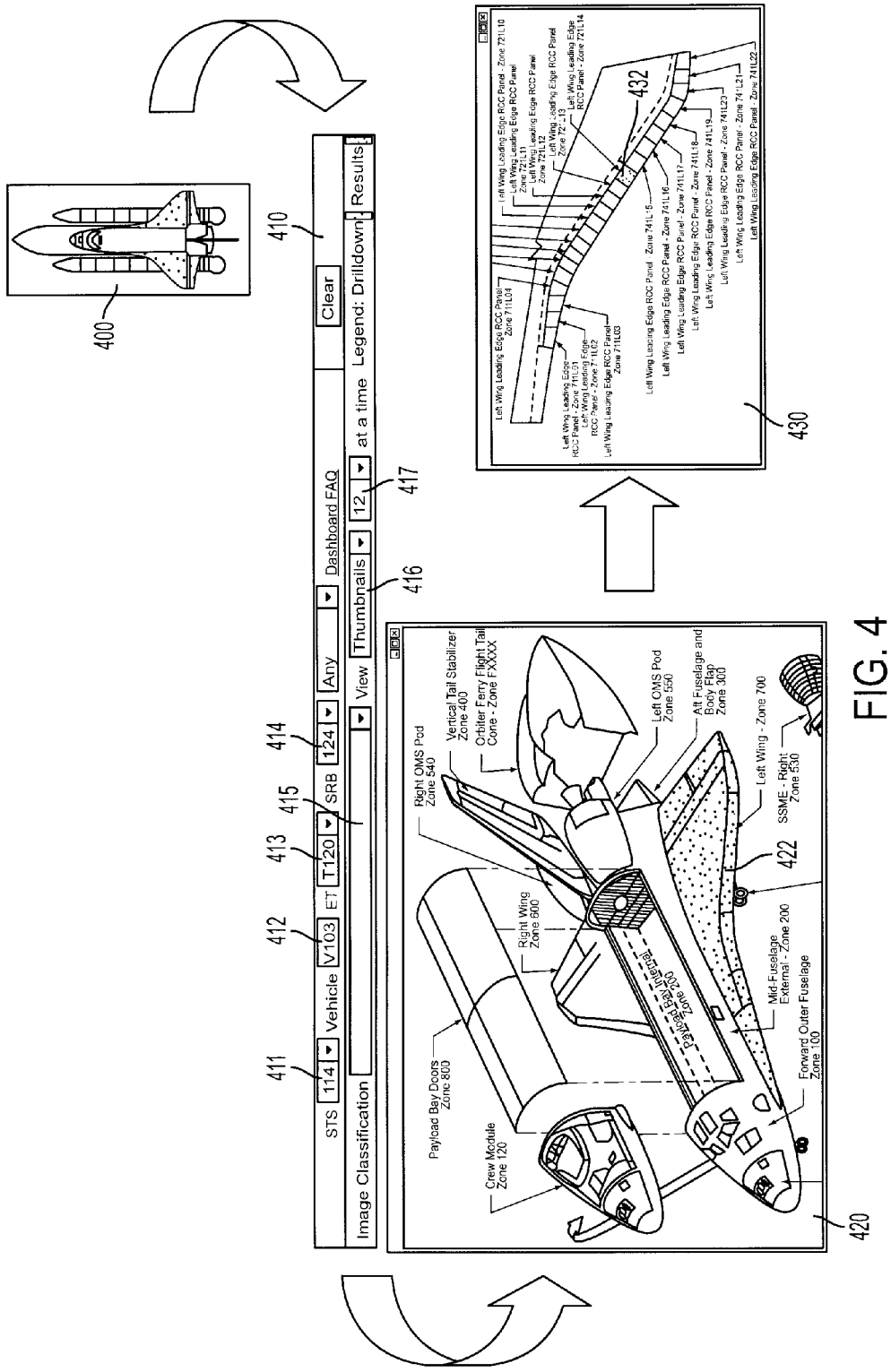
FIG. 4 is a screen capture of a high-data-level user interface as implemented in an embodiment of the disclosed image and information management system.
Figure 6:
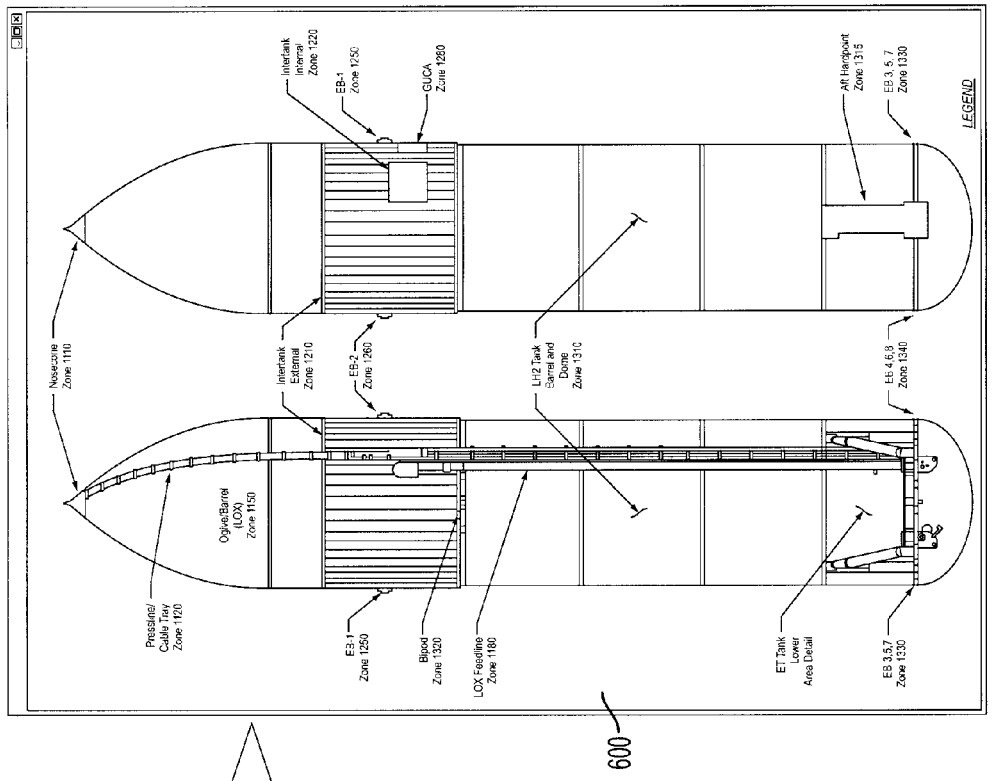
FIG. 6 is a screen capture of an alternative high-data-level user interface as implemented in an embodiment of the disclosed image and information management system.
Figure 6:
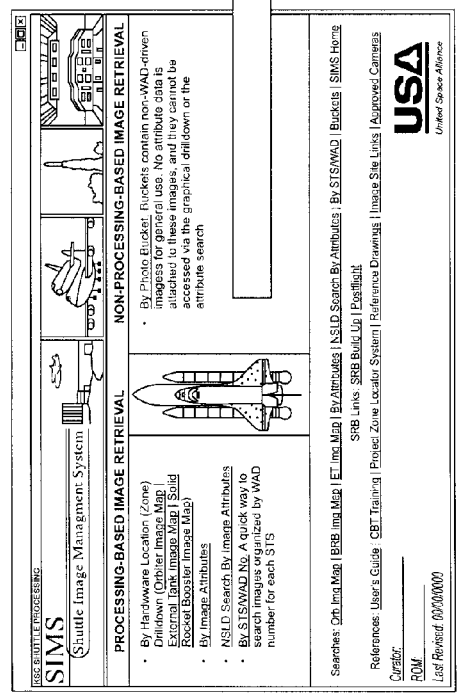

FIG. 4 is a screen capture of a high-data-level user interface as implemented in an embodiment of the disclosed image and information management system. In this embodiment, the user is presented with an overall image of the object in question 400, in this case, a Space Shuttle Vehicle ("SSV"), external fuel tank ("ET"), and solid rocket boosters ("SRB"). This image represents the highest level of the drilldown hierarchy. By clicking on one of the SSV, the ET, or an SRB, the user is taken to a screen similar to either SSV 420 or ET/SRB 600 of FIG. 6, respectively. The images contained in these screens represent the next lower level of the drilldown hierarchy.

Referring again to image 400, if the user is interested in accessing information about a portion of the SSV, the user selects the SSV, and is presented with a view similar to SSV 420. SSV 420 can provide a high-level, exploded view of a typical SSV, or the image can be used to represent a specific SSV configuration based on a particular mission (STS 411) chosen by the user from "dashboard" 410.

Figure 5:
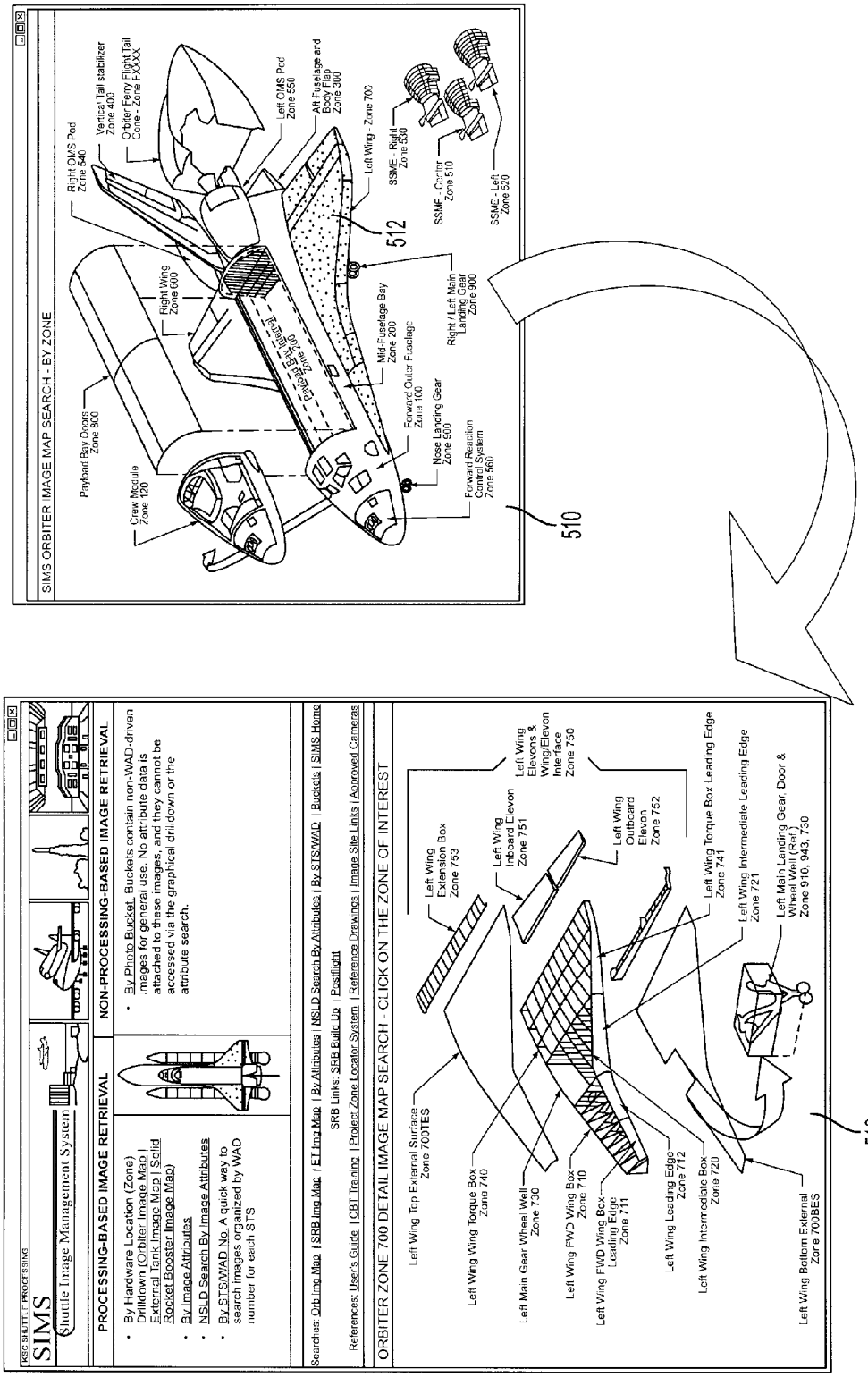
FIG. 5 is a screen capture of an intermediate-data-level user interface as implemented in an embodiment of the disclosed image and information management system.
Figure 7:
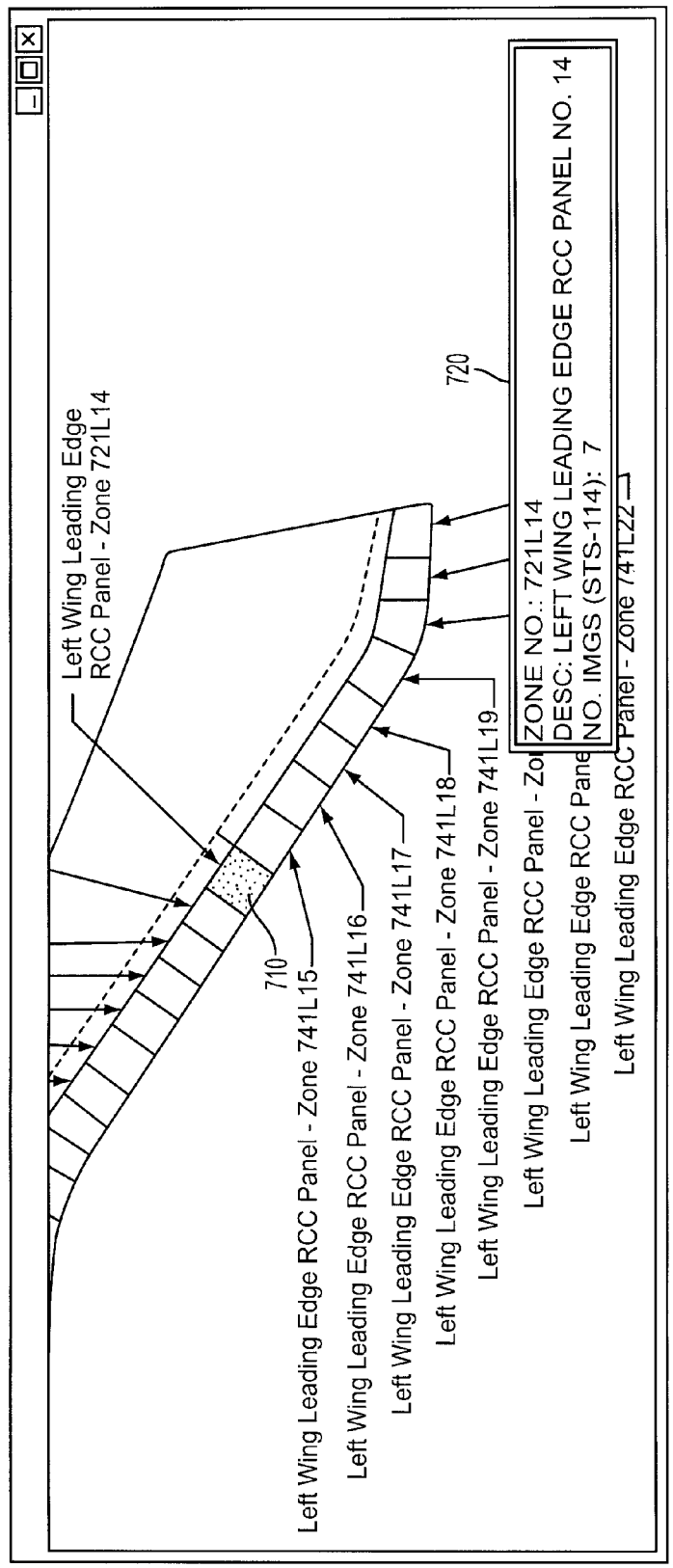
FIG. 7 is a partial screen capture of an alternative intermediate-data-level user interface as implemented in an embodiment of the disclosed image and information management system.

FIG. 5 is a screen capture of an intermediate-data-level user interface embodiment. By clicking on wing 422 of FIG. 4, the display can change to provide an exploded view of the wing, as illustrated in block 512. The user can click on a portion of the illustrated wing, such as Left Wing Torque Box Leading Edge Zone 741, to display a more detailed image, such as that illustrated in FIG. 7. FIG. 7 is a partial screen capture of an alternative intermediate-data-level user interface embodiment. Information about a given wing component, such as component 710, can be obtained by hovering a pointer over a given component, right-clicking on the component, or otherwise interacting with the component. Such information may be presented in a component-specific information display such as component information 720. By double-clicking on the component or otherwise interacting with the component, the user can cause the display to change to one similar to that illustrated in FIG. 8.

Figure 8:
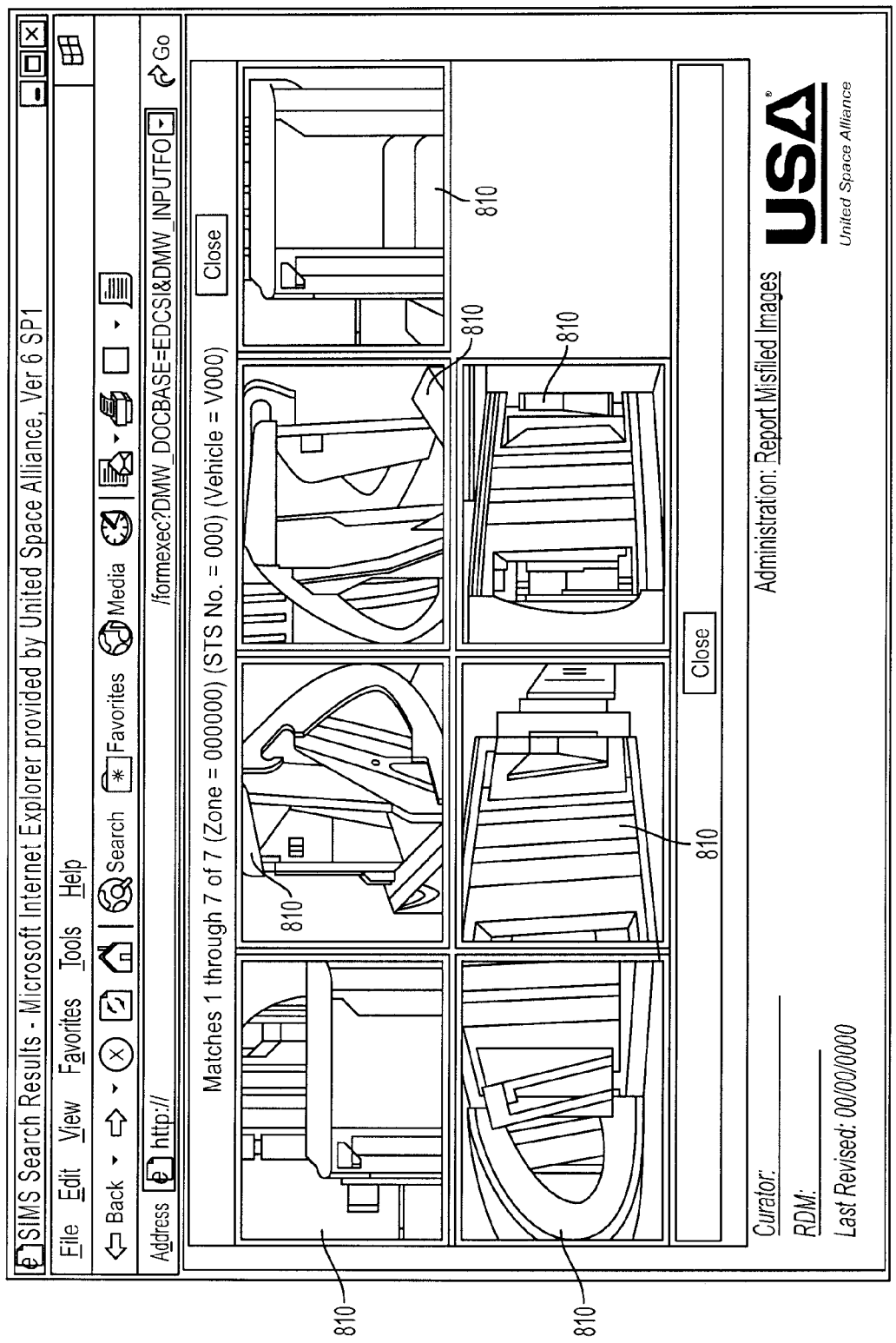
FIG. 8 is a screen capture of a lower-data-level user interface as implemented in an embodiment of the disclosed image and information management system.

FIG. 8 is a screen capture of a lower-data-level user interface embodiment. FIG. 8 presents a series of thumbnail photographs 810 of component 710 of FIG. 7, the photographs having been taken during assembly, maintenance, or the like of the component. By clicking on or otherwise interacting with a photograph, the user can cause the display to change to one similar to that of FIG. 9.

Figure 9:
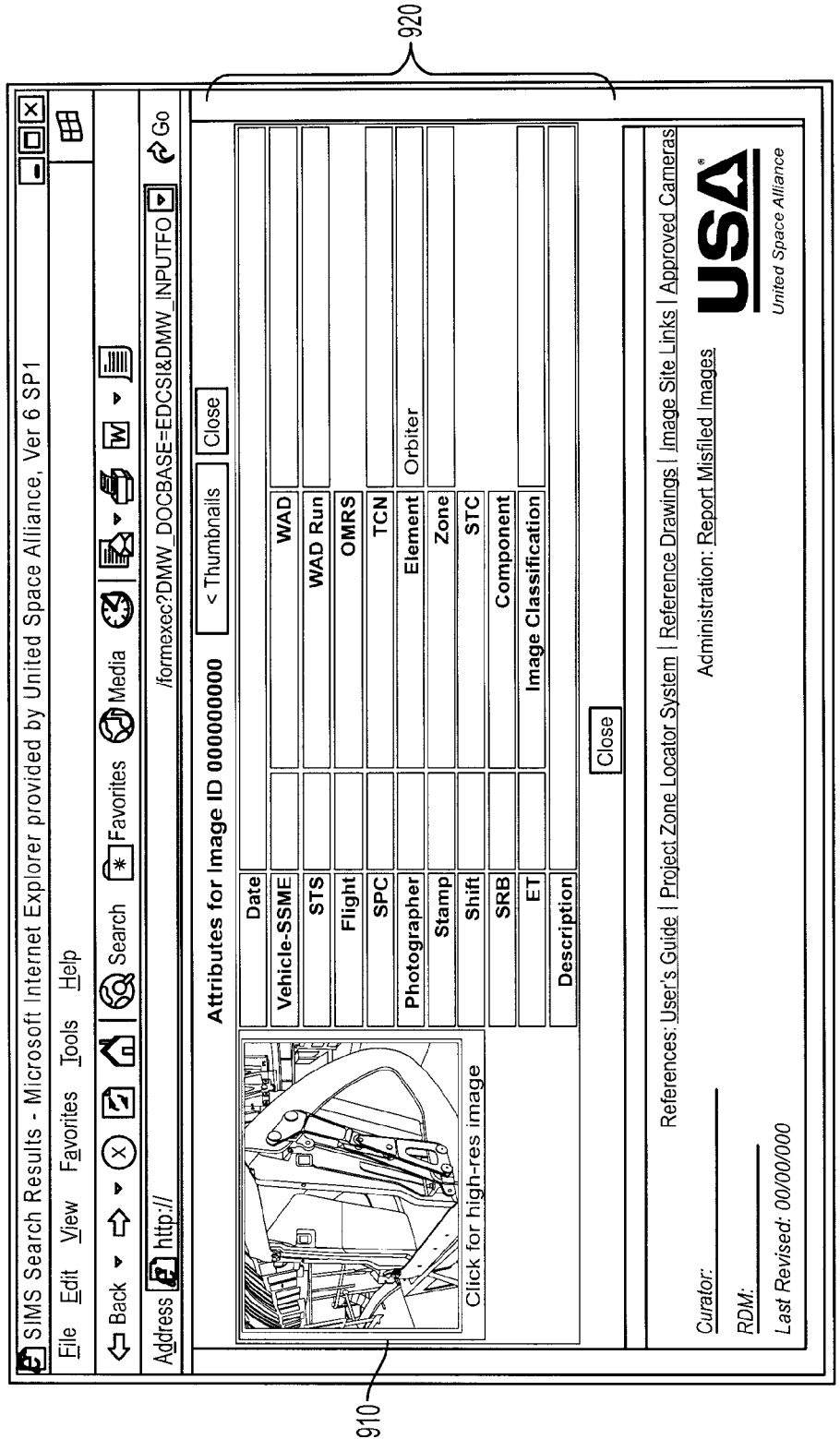
FIG. 9 is a screen capture of a low-data-level user interface as implemented in an embodiment of the disclosed image and information management system.

FIG. 9 is a screen capture of a low-data-level user interface embodiment. In FIG. 9, another thumbnail photograph 910 of component 710 is presented, along with information 920 about the thumbnail and the component or components in the photograph. Such information may include, but is not limited to, the date on which the photograph was taken, the vehicle into which the component or components are installed, the photographer's name, a description of the contents of the photograph, and the like. By clicking on thumbnail photograph 910, the display can change to one similar to that illustrated in FIG. 10.

Figure 10:
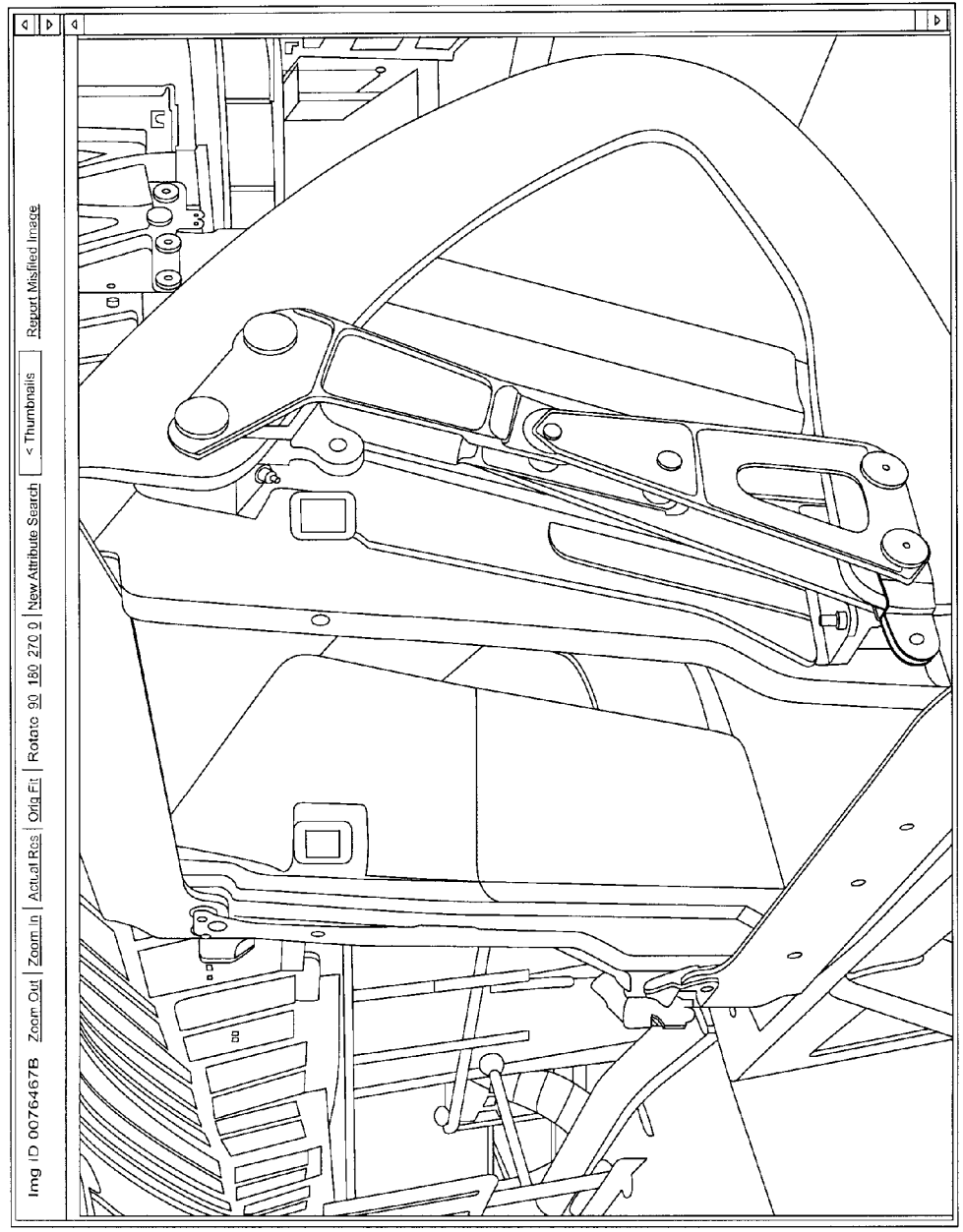
FIG. 10 is a screen capture of a detailed photograph and an image control toolbar for controlling display of the photograph, as implemented in an embodiment of the disclosed image and information management system.

FIG. 10 is a screen capture of a detailed photograph and an image control toolbar embodiment, wherein the image control toolbar permits the user to control the display of the photograph. By default, the display illustrated in FIG. 10 preferably scales the photograph to the largest size possible consistent with the screen or other device on which the photograph is being displayed to the user. Panning the photograph within the display window can be accomplished by operating scroll bars associated with the image, by clicking on the image to bring up a specialized move cursor that "sticks" to the image and allows the photograph to be moved in any direction within the confines of the display window (not illustrated), or other such means.

Figure 11:
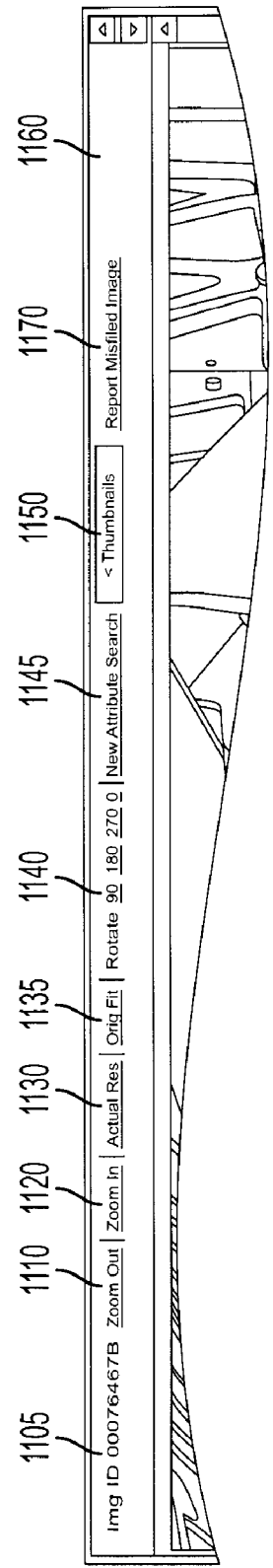
FIG. 11 is a screen capture of an image control toolbar as implemented in an embodiment of the disclosed image and information management system.

FIG. 11 is a screen capture of an image control toolbar embodiment. As FIG. 11 illustrates, the toolbar may also include a unique photograph or image identifier 1105. The toolbar may also allow the user to zoom in using control 1120 or zoom out using control 1110, view the photograph at its actual resolution using control 1130, and rotate the photograph using control 1140. The toolbar can also allow the user to easily resize the photograph to fit the screen using control 1135. The toolbar may also allow the user to rotate the photograph by fixed amounts 1140. The user an start a new search based on data attributes of photographs using control 1145. The user can report a misfiled or incorrectly classified photograph using control 1170, and quickly return to the thumbnail interface illustrated in FIG. 8 by interacting with button 1150. Interacting with a "close" button or the like (not illustrated) can cause the display to return to a default interface view, such as that illustrated in FIG. 4.

The user interfaces, or screens, illustrated in FIGS. 4-11 allow the user to quickly navigate to all information about a component in question via a hierarchical interface. The interface uses the user's selections as a basis for searching a database for information related to the presented image or component. To facilitate entry of images, photographs, and related information into the system, an embodiment of the invention preferably includes well-structured user interfaces that simplify the organization and data entry tasks.

Figure 12:
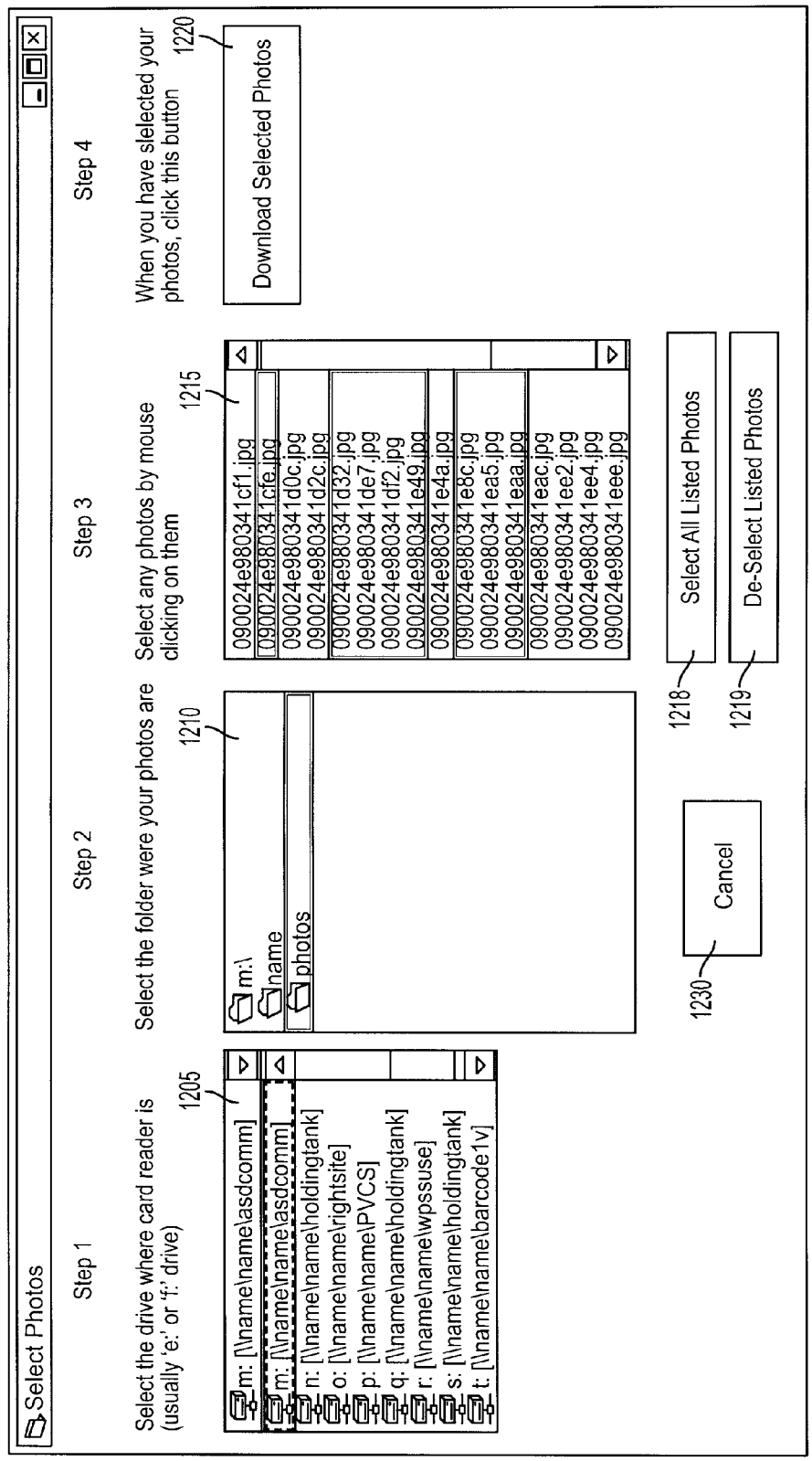
FIG. 12 is a screen capture of an image selection user interface as implemented in an embodiment of the disclosed image and information management system.

FIG. 12 is a screen capture of an image selection user interface embodiment. In this interface, the user can select the drive or other device 1205 on which one or more images are stored and, from that device, the path to the folder or directory 1210 containing the images. List box 1215 enumerates all images in the selected folder or directory, and the user can select one or more entries for importation into the system. Select all button 1218 allows the user to quickly select all images listed in list box 1215, and de-select button 1219 clears list box 1215 of all selected images. By clicking cancel button 1230, the user can cancel the image importation process. When the user has selected the images to be imported, the user can click download button 1220. The images are then imported into the system for further processing.

Figure 13:
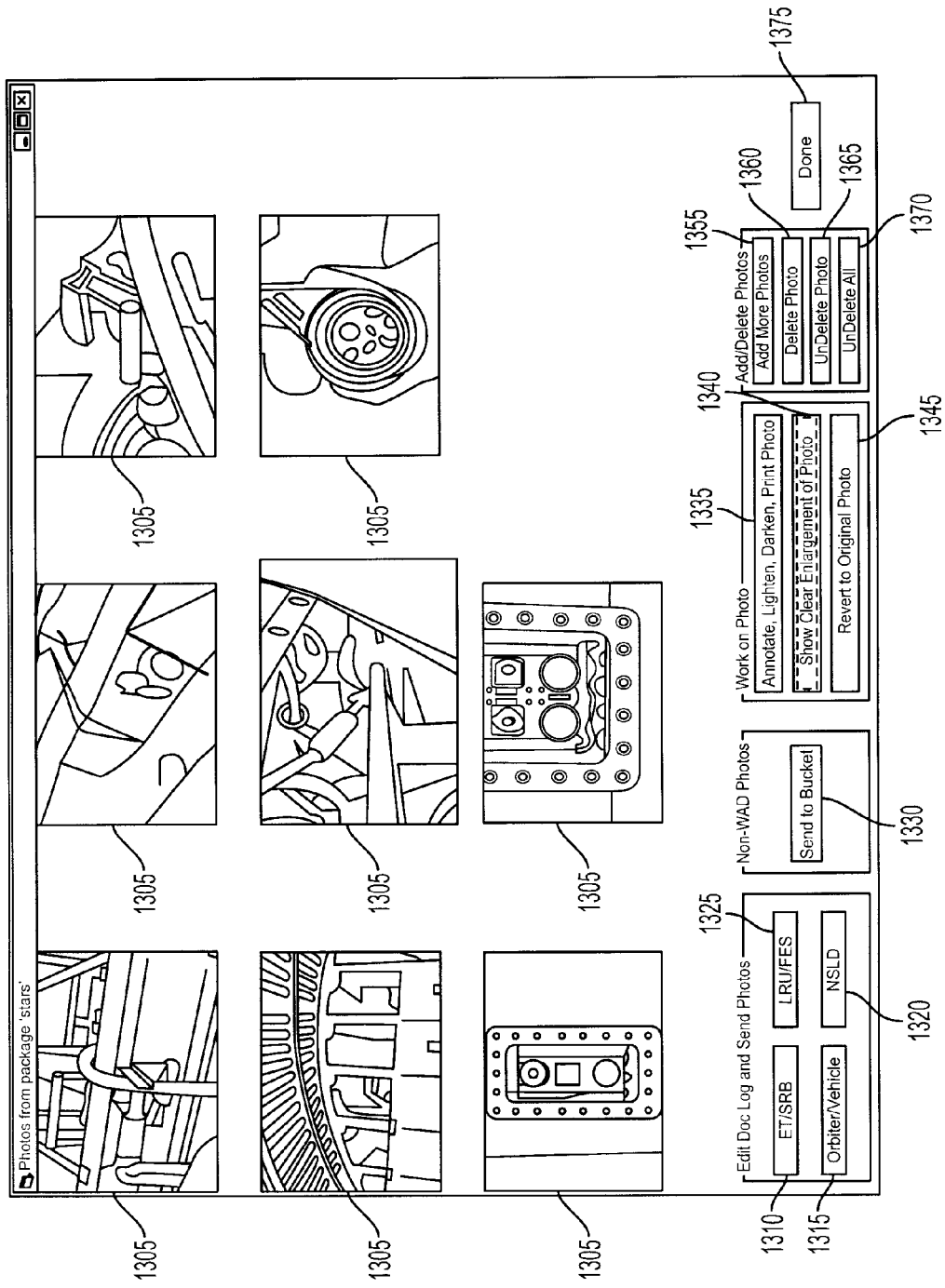
FIG. 13 is a screen capture of an image attribute data entry interface as implemented in an embodiment of the disclosed image and information management system.

FIG. 13 is a screen capture of an image attribute data entry interface embodiment. Once the images are imported into the system, the user is presented with thumbnails 1305 of each of the imported images, and with various tools to assist with the importation process. The user can add additional images by clicking button 1355, delete a selected image by clicking button 1360, undelete an image by clicking button 1365, and undelete all deleted images by clicking button 1370.

The user can also enhance and annotate an image by clicking button 1335. Such enhancements may include, but are not limited to, adjusting the lighting levels in an image, adjusting the contrast or brightness, correcting the color, and the like. Users may be prevented from directly editing image content. Further, the system may maintain copies of all images, both pre-edit and post-edit, along with a record of the user making the edits. If a user is not satisfied with the changes made, the user can click button 1345 to revert to the previously stored image. The annotations can include comments and notes about the image.

The system allows the user to view a larger version of a selected image by clicking button 1340. This can cause the display to change to one similar to that of FIG. 10, with a toolbar similar to that of FIG. 11.

The user can also indicate that the image is part of an external fuel tank ("ET") assembly or solid rocket booster ("SRB") by clicking button 1310; part of an orbiter, SSV, or other vehicle by clicking button 1315; as a line replaceable unit ("LRU") or flight element set ("FES") by clicking button 1325; and as part of the NASA Shuttle Logistics Depot ("NSLD") by clicking button 1320. Although the preceding description focuses on clicked buttons, it should be apparent to one skilled in the art that alternative user interface elements and user interaction means can be substituted therefor without departing from the spirit or the scope of the disclosed image and information management system.

Figure 14:
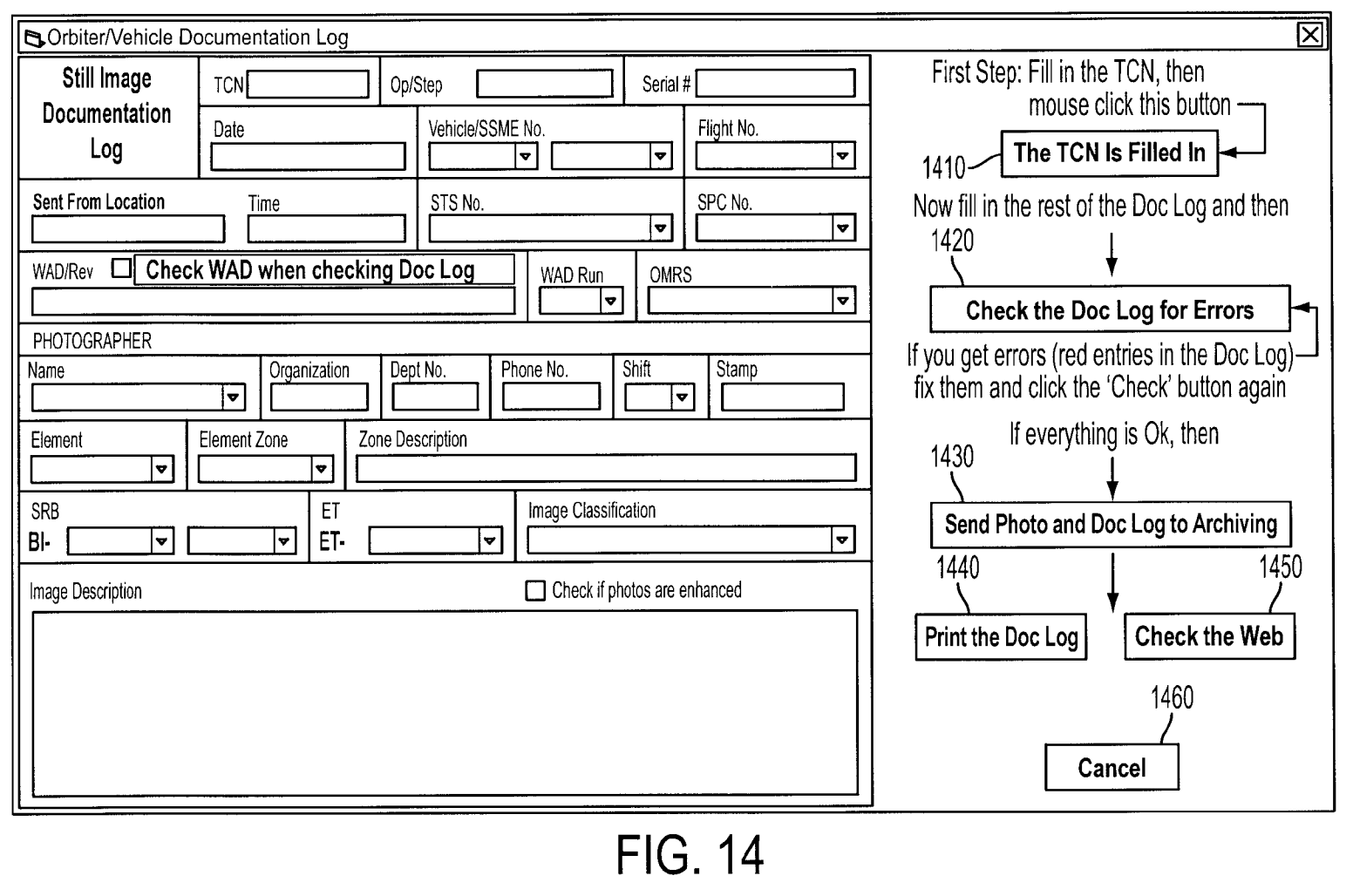

When the buttons are clicked, an alternative user interface can be provided which allows the user to further define the component illustrated in the image. This allows the user to quickly associate the image with an appropriate portion of the entire assembly, and thus to appropriately locate the image within the drilldown hierarchy. FIG. 14 is an example of a user interface providing an orbiter/vehicle documentation log interface.

Figure 15:
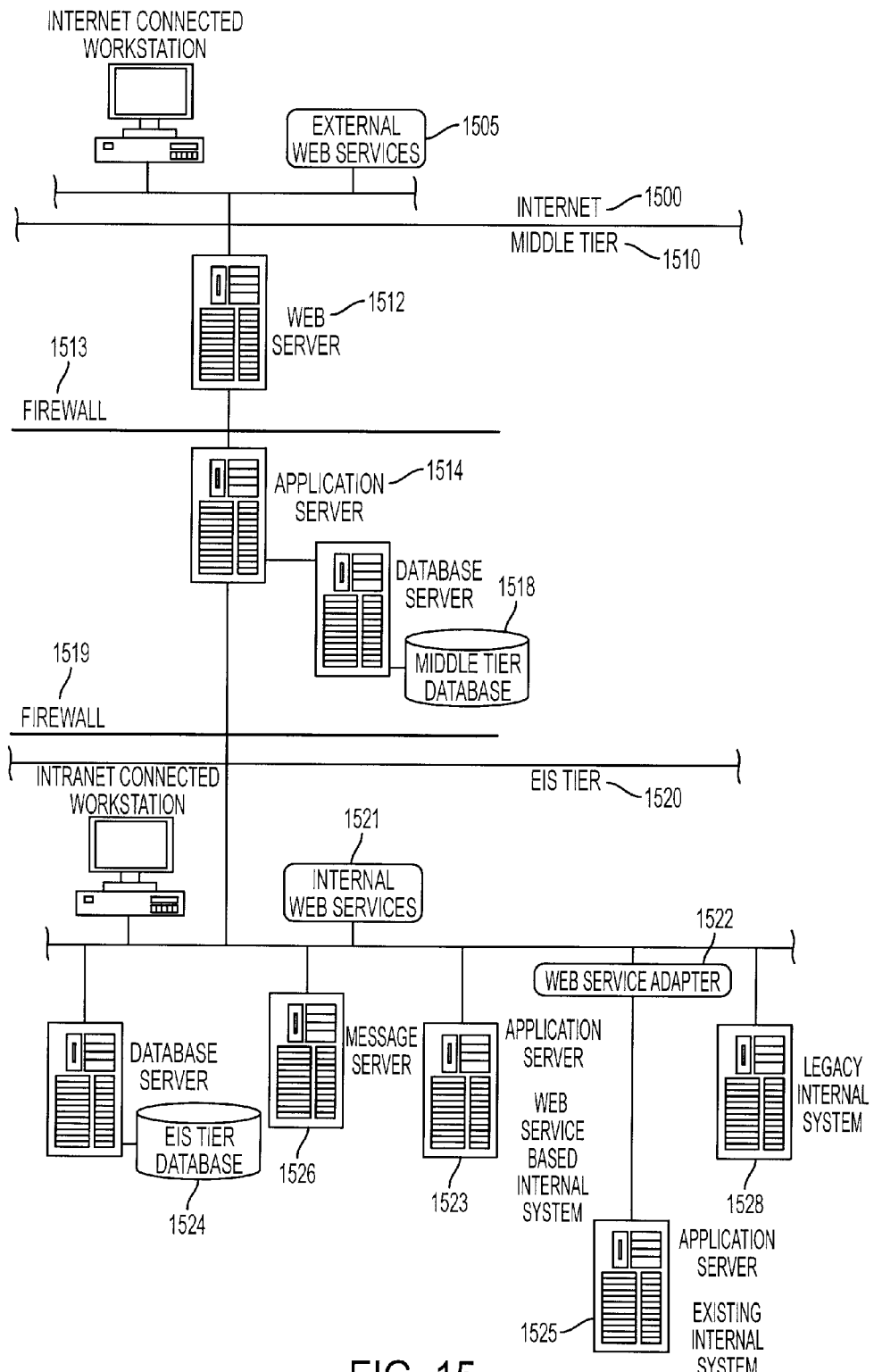
FIG. 15 is a block diagram of an alternative computer architecture for implementing an embodiment of the disclosed image and information management system.

FIG. 15 is a block diagram of an alternative computer architecture embodiment. The illustrated architecture is an "n-tier" architecture that is implemented in three tiers, Internet 1500, Middle Tier 1510, and EIS Tier 1520. Internet tier 1500 provides an interface to the functions and data presented via the other tiers, and can do so directly through the interface with web server 1512, or indirectly via the interface provided by web services 1505.

Middle Tier 1510 provides a layer of abstraction through which the data stored in EIS Tier 1520 can be accesses and formatted for presentation to Internet tier 1500. Middle Tier 1510 preferably includes a web server 1512, wherein web server 1512 can provide an interface to Internet 1500, such as, but not limited to, via one or more HTTP or XML formatted documents, document editors such as the toolbar of FIG. 11, and the like. Although web server 1512 is illustrated as operating outside a corporate or other firewall 1513, and such an operating arrangement is preferred for security purposes, it should be apparent to one skilled in the art that web server 1512 can operate within firewall 1513 without departing from the spirit or the scope of the disclosed image and information management system.

Web server 1512 acts as an interface to application server 1514. Application server 1514 acts as a business logic server, directing data access requests to appropriate databases 1518 and 1524, or to other information sources and services, such as those provided by internal web services 1521. In this role, application server 1514 can receive information about user interaction with an interface provided by web server 1512, such as the user clicking on a component in an image, and can translate such information into data requests in an appropriate query language for interacting with and retrieving information from the databases and internal web services 1521.

EIS Tier 1520 represents back-end systems to which middle tier 1510 provides an interface. EIS Tier 1520 includes systems such as a database associated with an existing content management system 1524, as well as trajectory tracking, resource planning and other internal systems and applications 1523, 1525, and 1526. Internal web services 1521 provides a standardized interface through which application server 1514 and other hardware and software can interface with these internal systems. Adapters 1522 can provide a further layer of abstraction, allowing the internal systems to be easily upgraded or replaced without necessitating rearchitecting the entire system.

Figure 16:
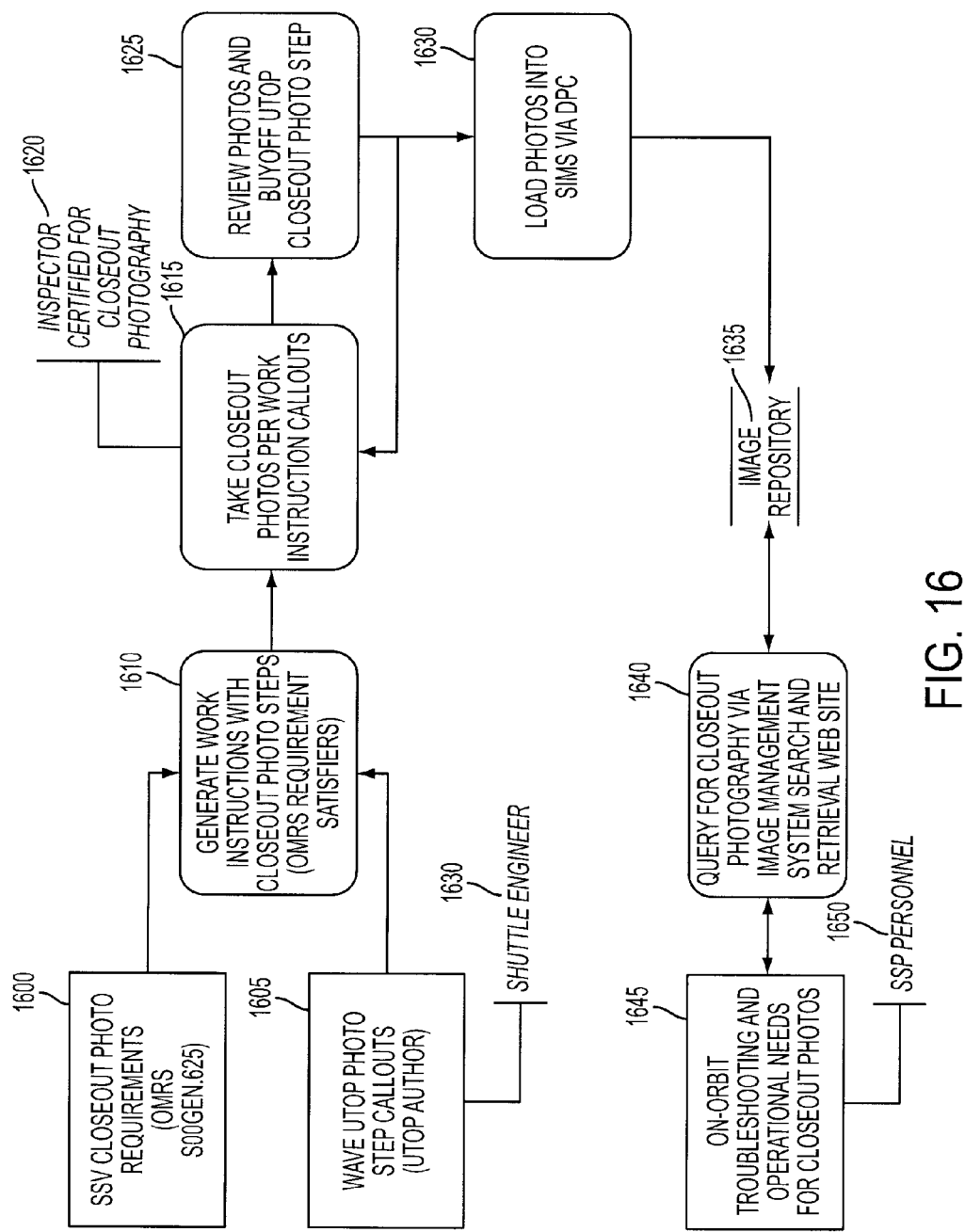
FIG. 16 is a block diagram illustrating a process through which the image and information management system can be integrated into business processes.

FIG. 16 is a block diagram illustrating a process through which the image and information management system can be integrated into business processes. Although FIG. 16 focuses on integration of the image and information management system into a spaceflight related business process, it should be apparent to one skilled in the art that the process can be readily adapted to allow the image and information management system to be integrated into alternative business processes without departing from the spirit or the scope of the disclosed image and information management system. In FIG. 16, a set 1600 of standard photographic or other images for an object or component is defined. The definition may be set forth in conjunction with a Work Authorization Document ("WAD") 1605 which can be authored by an engineer or other technical expert 1630. The WAD can be authored in a WAD Authoring Validation Environment ("WAVE") to verify that the WAD conforms to standards set forth by the National Aeronautics and Space Administration ("NASA") or another agency, corporation, or standard setting entity. When technical expert 1630 has finished the WAD, the WAVE can preferably generate work instructions 1610 for technicians repairing, maintaining, or otherwise interacting with the component that is the subject of the WAD. Such work instructions 1610 can include instructions on when to photograph the component, how to orient the component within the photograph, key aspects of the component to be included in the photograph, and the like. Although reference is made herein to photographs, it should be apparent to one skilled in the art that alternative imaging techniques, such as, without limitation, laser interferometric measurements of the component, thermal and/or infrared imaging, ultrasonic and/or x-ray imaging, and magnetic resonance imaging, may be substituted therefor. Similarly, it should be apparent that other types of information or multimedia content associated with the configuration of the object in question, such as, without limitation, engineering specifications or orders, CAD drawing, assembly instructions or videos, processing or manufacturing schedules, or quality inspection results, may be substituted therefor.

In an embodiment, the photographs can be taken by a technician interacting with the component. In another embodiment, an inspector 1620 certified for taking such photographs is responsible for taking the photographs 1615 required under the WAD. The photographs are then reviewed 1625 by one or more senior engineers or other authorized persons, and any additional or replacement photographs are taken as required by the authorized person(s). Once all necessary photographs have been taken and approved, the photographs are uploaded 1630 into the system, where they are placed in image repository 1635.

When the images are stored in image repository 1635, the photographs are available 1640 for study and use by authorized persons. Such use can include, but is not limited to, permitting support personnel 1650 to access the images in conjunction with on-orbit troubleshooting and operational needs 1645.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

The invention claimed is:

1. An information management system comprising:
   at least one image of an object, wherein the object is comprised of a plurality of components;
   a plurality of images of at least a subset of the plurality of components;
   at least one first data table, wherein the first data table stores at least one relationship between the plurality of components and the object;
   at least one second data table, wherein the second data table stores associations between the at least one image of the object and the object;
   at least one third data table, wherein the third data table stores associations between the plurality of images of the plurality of components and the plurality of components;
   at least one fourth data table, wherein the fourth data table stores an identified at least one actionable region associated with the at least one image of the object, and wherein the fourth data table associates at least one action with each of the stored at least one actionable regions; and,
   a user interface, wherein the user interface displays at least one of the plurality of component images or the at least one object image, wherein the user interface monitors user interaction to determine when a user activates a user actionable region.

2. The system of claim 1, wherein the second data table and the third data table are part of the same data table.

3. The system of claim 1, further comprising at least one database.

4. The system of claim 3, wherein the first data table, the second data table, the third data table, and the fourth data table, are stored in the at least one database.

5. The system of claim 3, wherein the plurality of images of at least a subset of the plurality of components and the at least one image of the object are stored within the at least one database.

6. The system of claim 1, further comprising at least one fifth data table, the fifth data table storing an identified at least one actionable region and permitting the at least one actionable region to be associated with at least one of the images.

7. The system of claim 6, further comprising a sixth data table, wherein the sixth data table stores at least one association between information about at least one of the plurality of components and the plurality of components.

8. The system of claim 1, wherein the user interface causes the information about at least one of the plurality of components to be displayed when an actionable region associated with a component is activated.

9. The system of claim 1, wherein the user interface further comprises a dashboard.

10. The system of claim 1, wherein the user interface changes based on the information to be presented therein.

11. The system of claim 1, the user interface comprising a toolbar when a component image is displayed, wherein the toolbar facilitates zooming in and out and reporting misfiled images.

12. The system of claim 1, wherein the first data table further stores the relationship between each component and any sub-components thereof.

13. The system of claim 12, wherein the first data table stores the relationships in an hierarchical data structure.

14. A method of presenting information to a user, comprising:
   receiving at least one image of an object;
   receiving a plurality of images of a plurality of components, wherein the object comprises the plurality of components;
   storing first information about at least a subset of the plurality of components;
   storing second information about the object;
   associating the stored first information with an appropriate one of the plurality of components;
   associating at least one first actionable region with at least a subset of the at least one images of the object;
   associating an action with the at least one first actionable region;
   associating at least one second actionable region with at least a subset of the plurality of images of the plurality of components;
   displaying for a user at least one image of the object;
   monitoring actions made by the user to determine when one of the at least one first actionable regions has been activated and performing the action associated with the activated first actionable region;
   displaying for the user at least one of the plurality of component images; and,
   monitoring actions made by the user to determine when one of the at least one second actionable regions associated with the displayed at least one component images has been activated.

15. The method of claim 14, further comprising associating an action with the at least one second actionable region and performing the action associated with the activated second actionable region when one of the at least one second actionable regions has been activated.

16. The method of claim 15, wherein the at least one action associated with a second actionable region comprises displaying information about the component in the image containing the second actionable region.

17. The method of claim 14, wherein the displaying of at least one of the plurality of component images and the monitoring of user actions to determine when one of the at least one actionable regions associated with the displayed at least one component images has been activated are iteratively repeated, thereby permitting the user to drill down to a desired component.

18. The method of claim 14, further comprising displaying a toolbar when the at least one of the plurality of images of the plurality of components is displayed for the user.

19. The method of claim 16, wherein the toolbar permits the user to at least zoom in, zoom out, and rotate the displayed image.

20. The method of claim 14, further comprising displaying a dashboard when any of the at least one images of the object are displayed.

* * * * *